United States Patent Office 3,461,174
Patented Aug. 12, 1969

3,461,174
PROCESS FOR PREPARING 2,5-DICHLORO-4-BROMOPHENOL
Delbert L. Hanna, Oak Park, Ill., assignor to Velsicol Chemical Corporation, Chicago, Ill., a corporation of Illinois
No Drawing. Filed Oct. 21, 1965, Ser. No. 500,312
Int. Cl. C07c *39/27*
U.S. Cl. 260—623                                     10 Claims

ABSTRACT OF THE DISCLOSURE

A process for the production of 2,5-dichloro-4-bromophenol which comprises hydrolyzing 1,4-dibromo-2,5-dichlorobenzene.

---

This invention relates to an improved process for the production of 2,5-dichloro-4-bromophenol.

It has been previously reported in the literature that 2,5-dichloro-4-bromophenol can be prepared from 2-chloro-4-bromo-5-nitrophenyl O-nitro-p-toluenesulphonate in a multistep procedure which includes reduction, diazotization, hydroylsis, and replacement of the diazonium group with chlorine or from 2,5-dichloro-4-bromoaniline by diazotization and warming with water or steam distilling. Prior attempts to prepare 2,5-dichloro-4-bromophenol by bromination of 2,5-dichlorophenol, such as by bromination in a solution of sodium acetate in glacial acetic acid, as described by Fox et al. J. Chem. Soc. 1930, p. 1860 have not been successful. The major product obtained by Fox et al. was 2,5-dichloro-4,6-dibromophenol with only a small quantity of 2,5-dichloro-4-bromophenol. Thus heretofore 2,5 - dichloro - 4 - bromophenol could not be produced readily by either bromination or hydrolysis.

Therefore, it is one object of the present invention to provide substantially pure 2,5-dichloro-4-bromophenol.

It is another object of this invention to produce readily recoverable 2,5-dichloro-4-bromophenol in high yields from 1,4-dibromo-2,5-dichlorobenzene.

Another object of this invention is to provide a process wherein 2,5-dichloro-4-bromophenol is produced readily from para-dichlorobenzene.

Still another object of this invention is to provide a process wherein the product consists predominantly of 2,5-dichloro-4-bromophenol which can be readily separted from reaction by-products.

These and other objects and advantages of the present invention will be readily apparent from the ensuing descrpition and examples.

In one aspect, the process of the present invention comprises selectively hydrolyzing 1,4 - dibromo - 2,5 - dichlorobenzene. In another aspect of this invention the process comprises brominating para-dichlorobenzene or chlorinating para-dibromobenzene to 1,4-dibromo-2,5-dichlorobenzene and selectively hydrolyzing the 1,4-dibromo-2,5-dichlorobenzene to 2,5 - dichloro - 4 - bromophenol.

It is unexpected that the product of the process of the present invention is predominantly 2,5-dichloro-4-bromophenol. This product comprises 2,5-dichloro-4-bromophenol and 2,5-dibromo-4-chlorophenol in a ratio of about 3:1. From previously reported experiments, one would expect that the product of the process of the present invention would be a mixture of trihalobenzenes, or predominately dibromochlorophenol, or a widely varied mixture of dibromochlorophenol and dichlorobromophenol, with very little of the latter. Surprisingly the process of the present invention yields predominately 2,5-dichloro-4-bromophenol and a minor amount of 2,5-dibromo-4-chlorophenol, the latter and other impurities being easily separable from the desired 2,5-dichloro-4-bromophenol.

More particularly, the process of the present invention for the production of 2,5-dichloro-4-bromophenol from 1,4-dibromo-2,5-dichlorobenzene comprises selectively hydrolyzing the latter, preferably with alcoholic alkali at a temperature of from about 150° C. to about 250° C., and most preferably at a temperature of from about 160° C. to about 200° C. The alcoholic alkali is preferably a mixture of an alkali metal hydroxide in a lower aliphatic alcohol. The alkali metal hydroxide is preferaby employed in a quantity of from 2 to 3 times the molar quantity of 1,4-dibromo-2,5-dichlorobenzene. The preferred alkali metal hydroxides are sodium hydroxide and potassium hydroxide. The most preferred lower aliphatic alcohol is methanol.

The process described above can be performed by charging the 1,4-dibromo-2,5-dichlorobenzene and other ingredients into a suitable reactor such as a stirred autoclave. The reaction mixture is stirred and heated at the reaction temperature and the stirring and heating is preferably continued for a period of at least one hour following completion of the addition. This process can be performed either batchwise or continuously.

In the process of the present invention for the production of 2,5-dichloro-4-bromophenol from para-dichlorobenzene or para-dibromobenzene, either of the latter is first converted to 1,4-dibromo-2,5-dichlorobenzene by halogenating. The halogenation is performed with up to about two moles of halogen per mole of the para-dihalobenzene, the halogen being bromine in the case of para-dichlorobenzene and chlorine in the case of para-dibromobenzene. The partially halogenated dihalobenzene can be recycled to improve the overall yield of the process.

The halogenation is preferably performed in the presence of a Friedel-Crafts catalyst such as aluminum chloride, iron chloride, and the like. As a practical matter a small amount of catalyst, such as from about 0.01% to about 5% is preferred, although trace amounts of catalyst are often effectve.

The bromination of para-dichlorobenzene can be performed readily by placing the para-dichlorobenzene in a suitable reactor having a bromine condenser and vent. The Friedel-Crafts catalyst is added to the para-dichlorobenzene and the resulting mixture stirred. The bromine is slowly added to the reaction mixture preferably below the surface of the reaction mixture. Although the reaction starts to occur at room temperature, the temperature first rises as the reaction proceeds and then falls. The reaction mixture can be heated up to about 175° C. to insure complete reaction.

In a similar manner, para-dibromobenzene can be chlorinated to form 1,4-dibromo-2,5-dichlorobenzene by using a similar amount of chlorine under approximately the same conditions.

After the para-dichlorobenzene or para-dibromobenzene has been halogenated to 1,4-dibromo-2,5-dichlorobenzene, the catalyst and unreacted halogen are removed by neutralization and filtering. The product 1,4-dibromo-2,5-dichlorobenzene is preferably purified such as by recrystallization from a suitable solvent such as a mixture of carbon tetrachloride and hexane. The hydrolysis of the 1,4-dibromo-2,5-dichlorobenzene to form 2,5-dichloro-4-bromophenol can be performed as described above.

The process of the present invention provides a product which contains up to approximately 75% 2,5-dichloro-4-bromophenol and minor amounts of 2,5-dibromo-4-chlorophenol and other by-products. The desired 2,5-dichloro-4-bromophenol can be isolated from the product of the process of the present invention by fractional distillation. Substantially pure 2,5-dichloro-4-bromophenol is thus obtained.

The following examples are presented to illustrate the process of the present invention:

EXAMPLE 1

Preparation of 1,4-dibromo-2,5-dichlorobenzene

Para-dichlorobenzene, assay 99% (500 g.) was placed in a one liter three-neck, round bottom flask equipped with a mechanical stirrer, internal thermometer, dropping funnel and vented condenser. Aluminum chloride (0.5 g.) was added to the flask. A stoichiometric amount of bromine was added to the reaction mixture from the dropping funnel at a rate to avoid boiling over the contents of the flask and to avoid refluxing excessive amounts of bromine. The bromination began at room temperature. The heat of reaction was offset by the heat of melting the para-dichlorobenzene. The temperature of the reaction mixture was slowly increased to 145° C. to retain the 1,4-dibromo-2,5-dichlorobenzene in solution. Stirring was continued at 145° C. for several hours. Thereafter sodium carbonate was added to the hot solution with stirring to neutralize the aluminum chloride and hydrogen bromide. The neutralized reaction mixture was poured into carbon tetrachloride and filtered while hot. The filtrate was crystallized from a mixture of carbon tetrachloride and hexane, washed with hexane and dried to yield 1,4-dibromo-2,5-dichlorobenzene melting 146–148° C.

EXAMPLE 2

Preparation of 2,5-dichloro-4-bromophenol 1,4-dibromo-2,5-dichlorobenzene (245 g.), prepared in Example 1 was placed into a one-gallon stirred autoclave. Sodium hydroxide (90 g.) was dissolved in one liter of methanol and the solution slowly added to the autoclave. The contents of the autoclave were stirred and heated at 190° C. for four hours. At the end of this time the methanol was distilled from the reaction mixture. Water was added during the distillation to maintain the volume of the mixture. The distillation was continued to remove a small amount of oily distillate. The residue from the distillation was acidified yielding a precipitate. The precipitate was steam distilled yielding a distillate which had the following analysis by gas chromatography:

| | Percent |
|---|---|
| 2,5-dichloro-4-bromophenol | 62.1 |
| 2,5-dibromo-4-chlorophenol | 17.2 |
| Other | 21.7 |

EXAMPLE 3

Preparation of 2,5-dichloro-4-bromophenol 1,4-dibromo-2,5-dichlorobenzene (245 g.), prepared in Example 1, was placed into a one-gallon stirred autoclave. Sodium hydroxide (70 g.) was dissolved in one liter of methanol and the solution slowly added to the autoclave. The contents of the autoclave were stirred and heated at 170° C. for four hours. At the end of this time the reaction mixture was filtered to remove the precipitated solids and distilled to remove the methanol. Water was added during the distillation to maintain the volume of the mixture. The distillation was continued to remove a small amount of oily distillate and a substantial amount of anisoles which crystallized on cooling. The residue from the distillation was acidified yielding a precipitate which was steam distilled yielding a distillate having the following analysis by gas chromatography:

| | Percent |
|---|---|
| 2,5-dichloro-4-bromophenol | 73.2 |
| 2,5-dibromo-4-chlorophenol | 24.7 |
| Other | 2.1 |

I claim.

1. A process for the production of 2,5-dichloro-4-bromophenol which comprises brominating para-dichlorobenzene to 1,4-dibromo-2,5-dichlorobenzene with bromine in the presence of a Friedel-Crafts catalyst; removing the catalyst and unreacted bromine; and hydrolyzing the 1,4-dibromo-2,5-dichlorobenzene with methanolic alkali metal hydroxide at a temperature of from about 150° C. to about 250° C.

2. A process for the production of 2,5-dichloro-4-bromophenol which comprises chlorinating para-dibromobenzene to 1,4-dibromo-2,5-dichlorobenzene with chlorine in the presence of a Friedel-Crafts catalyst; removing the catalyst and unreacted chlorine; and hydrolyzing the 1,4-dibromo-2,5-dichlorobenzene with methanolic alkali metal hydroxide at a temperature of from about 150° C. to about 250° C.

3. A process for the production of 2,5-dichloro-4-bromophenol which comprises hydrolyzing 1,4-dibromo-2,5-dichlorobenzene with an alkali metal hydroxide in the presence of methanol at a temperature of from about 150° C. to about 250° C.

4. A process for the production of 2,5-dichloro-4-bromophenol which comprises hydrolyzing 1,4-dibromo-2,5-dichlorobenzene with from twice to three times the molar quantity of 1,4-dibromo-2,5-dichlorobenzene, of an alkali metal hydroxide in the presence of methanol at a temperature of from about 150° C. to about 250° C.

5. A process for the production of 2,5-dichloro-4-bromophenol which comprises hydrolyzing 1,4-dibromo-2,5-dichlorobenzene with from twice to three times the molar quantity of 1,4-dibromo-2,5-dichlorobenzene, of sodium hydroxide in the presence of methanol at a temperature of from about 160° C. to about 200° C.

6. A process for the production of 2,5-dichloro-4-bromophenol which comprises hydrolyzing 1,4-dibromo-2,5-dichlorobenzene with from twice to three times the molar quantity of 1,4-dibromo-2,5-dichlorobenzene, of potassium hydroxide in the presence of methanol at a temperature of from about 160° C. to about 200° C.

7. A process for the production of 2,5-dichloro-4-bromophenol which comprises brominating para-dichlorobenzene to 1,4-dibromo-2,5-dichlorobenzene with at least twice the molar quantity of para-dichlorobenzene, of bromine in the presence of a Friedel-Crafts catalyst; removing the catalyst and unreacted bromine; and hydrolyzing the 1,4-dibromo-2,5-dichlorobenzene with from twice to three times the molar quantity of 1,4-dibromo-2,5-dichlorobenzene of an alkali metal hydroxide in the presence of methanol at a temperature of from about 150° C. to about 250° C.

8. A process for the production of 2,5-dichloro-4-bromophenol which comprises brominating para-dichlorobenzene to 1,4-dibromo-2,5-dichlorobenzene with more than twice the molar quantity of para-dichlorobenzene, of bromine in the presence of a Friedel-Crafts catalyst; removing the catalyst and unreacted bromine; and hydrolyzing the 1,4-dibromo-2,5-dichlorobenzene with from twice to three times the molar quantity of 1,4-dibromo-2,5-dichlorobenzene, of an alkali metal hydroxide in the presence of methanol at a temperature of from about 160° to about 200° C.

9. The process of claim 8 wherein the alkali metal hydroxide is sodium hydroxide.

10. The process of claim 8 wherein the alkali metal hydroxide is potassium hydroxide.

References Cited

Groggins: "Unit Processes in Organic Synthesis," 5th ed. (1958), pp. 204–7; 235–8; 258–261 and 265–66.

BERNARD HELFIN, Primary Examiner

W. B. LONE, Assistant Examiner

U.S. Cl. X.R.

260—629, 650